Figure 11:
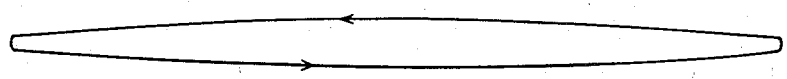

July 8, 1958  A. WOODRUFF  2,842,172
SAW SASH GUIDE MECHANISM FOR SAWMILLS
Filed Nov. 29, 1955  4 Sheets-Sheet 1
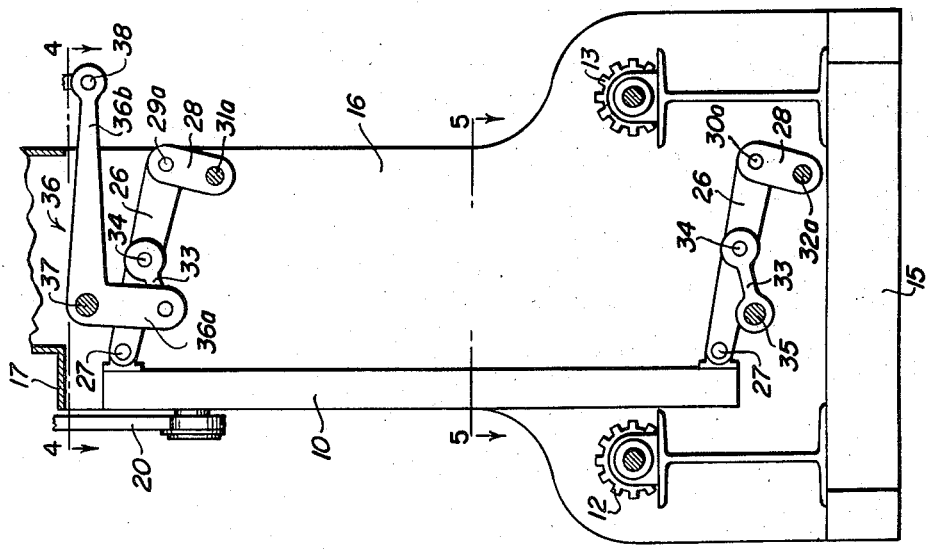
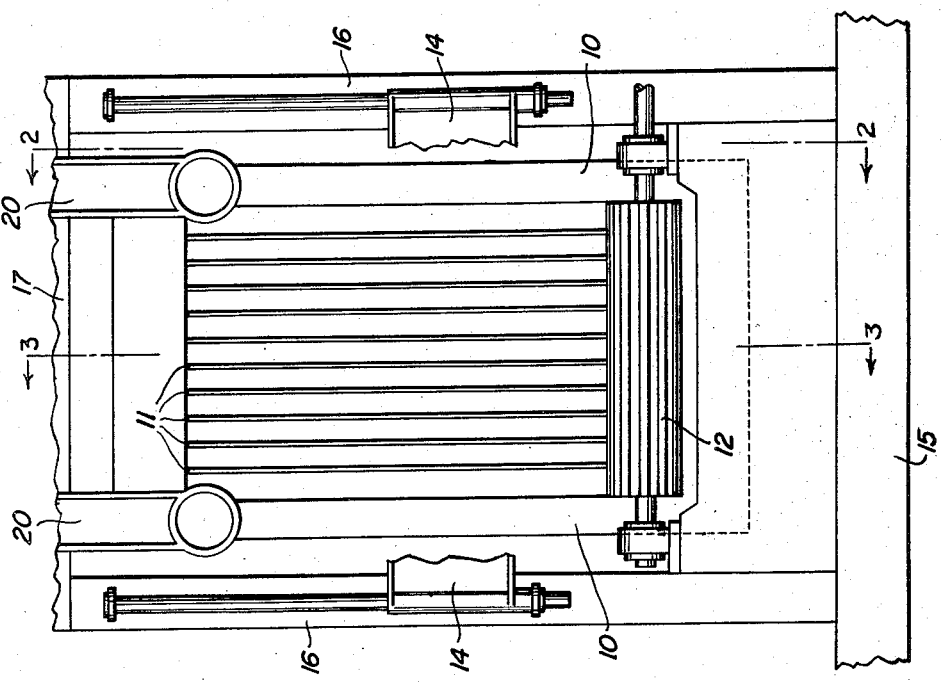
INVENTOR.
ALVIN WOODRUFF
BY
ATTORNEYS

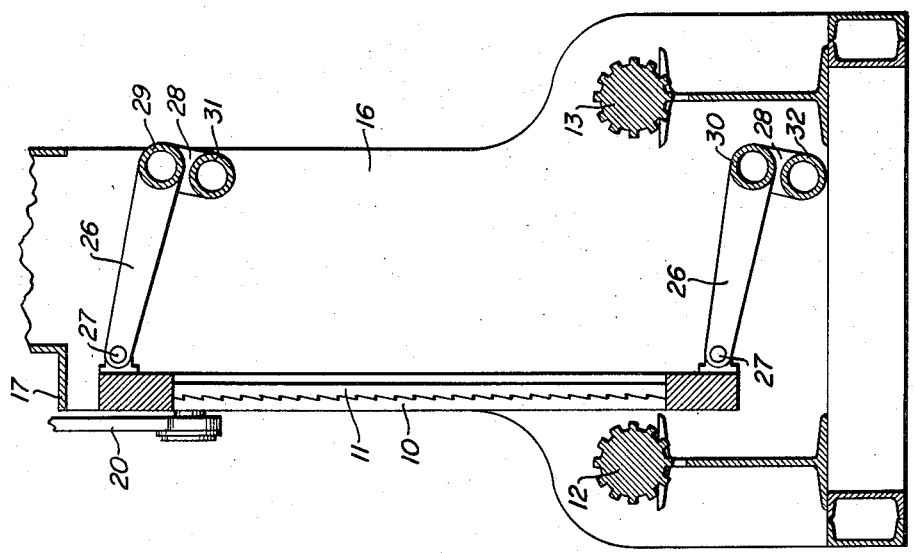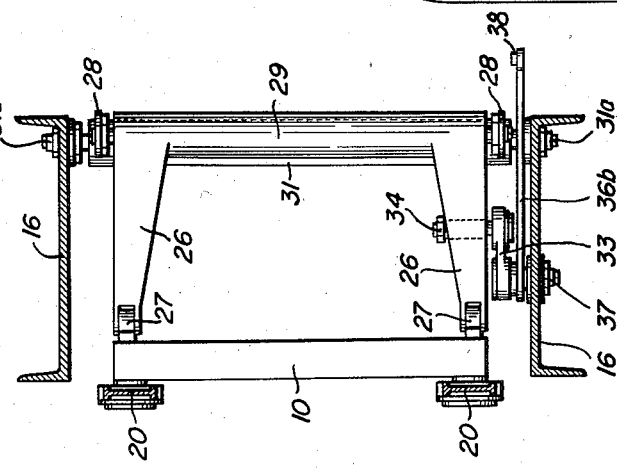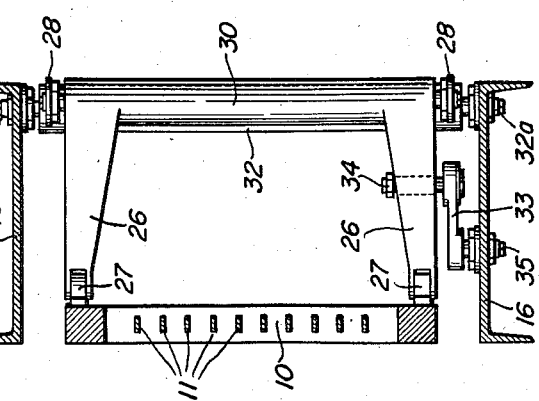

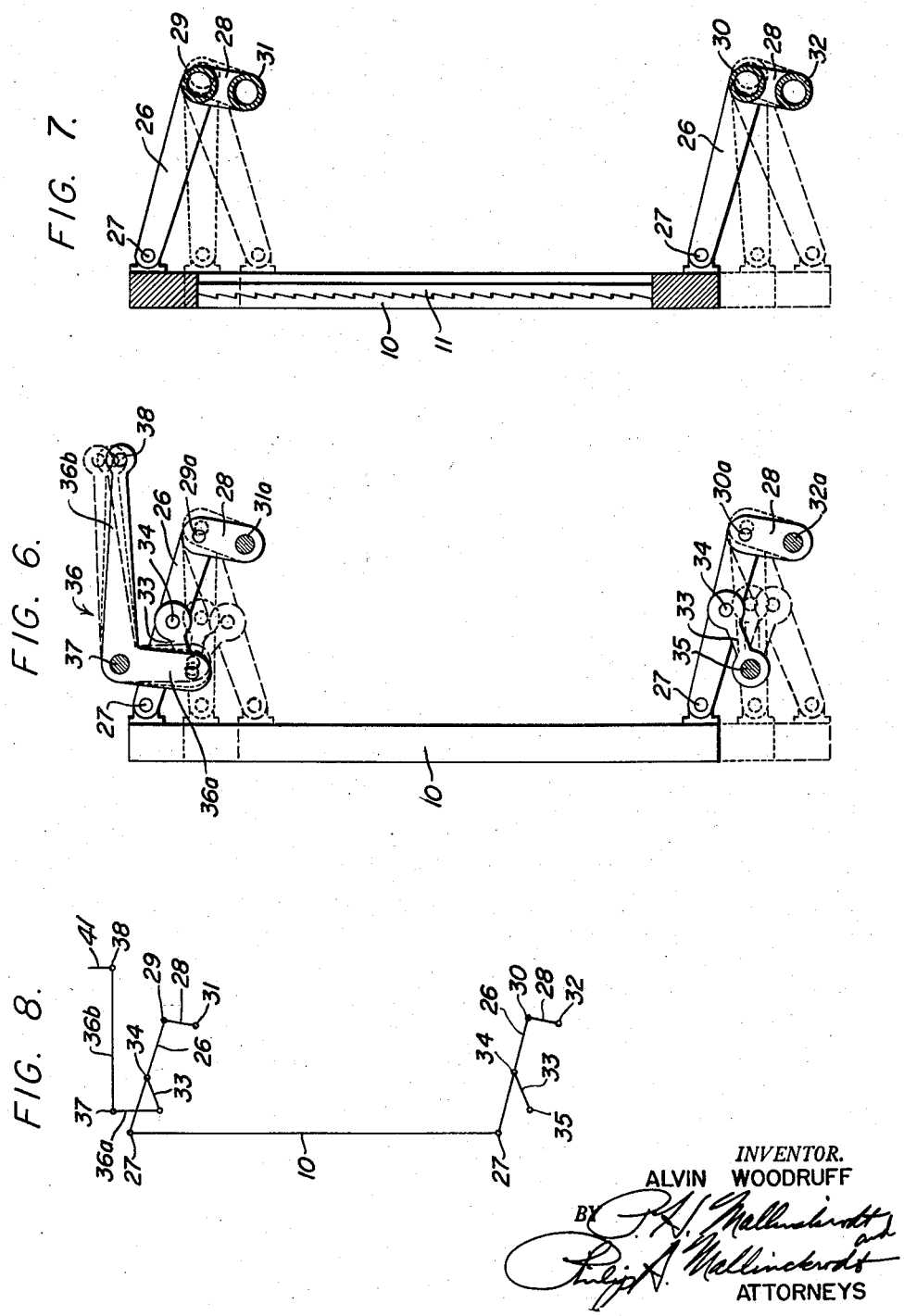

July 8, 1958 A. WOODRUFF 2,842,172
SAW SASH GUIDE MECHANISM FOR SAWMILLS
Filed Nov. 29, 1955 4 Sheets—Sheet 4

INVENTOR.
ALVIN WOODRUFF
BY
ATTORNEYS

United States Patent Office 2,842,172
Patented July 8, 1958

2,842,172

SAW SASH GUIDE MECHANISM FOR SAWMILLS

Alvin Woodruff, Dallas, Oreg.

Application November 29, 1955, Serial No. 549,740

10 Claims. (Cl. 143—82)

This invention relates to sawmills of reciprocative gang saw type, and is concerned particularly with saw sash guide mechanism therefor.

In my copending patent application Serial No. 453,290 filed August 31, 1954 entitled, "Single Sash Gang Sawmill," I disclose among other things a unique type of guide mechanism for the reciprocative saw sash, such mechanism being made up of various levers, pivots, and linkage. The present invention constitutes an improvement on that mechanism, whereby even more satisfactory results are obtained by a simpler and less expensive construction.

In accordance with with the present invention, several of the pivots are eliminated and a large part of the linkage is replaced by simpler mechanism. Advantageously, and as one aspect of the invention, means for oscillating the saw sash backwardly and forwardly during its up and down reciprocation are tied in with such guide mechanism to provide a structurally and functionally integrated, smooth-working machine.

Thus, not only is the construction simplified and reduced in cost, but an effective oscillating movement of the saw sash is obtained during saw sash reciprocation. With my previous mechanism, it was necessary to utilize independent oscillating means when it was desired to oscillate the saws.

Further objects and features of the invention will become apparent from the following detailed description of the presently preferred specific embodiment here illustrated to exemplify the structural concepts involved.

Figure 10:
Figure 9:
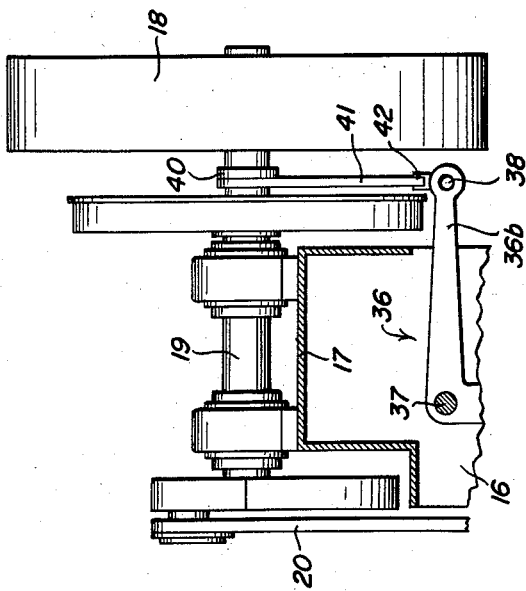

In the drawings:

Fig. 1 represents a fragmentary front elevation of a sawmill conforming to the disclosure of my afore-mentioned copending application, but provided with the simplified saw sash guide mechanism of my present invention, the saw sash being shown at the top of a reciprocative stroke;

Fig. 2, a vertical section taken on the line 2—2 of Fig. 1, showing in elevation the saw sash and the guide mechanism with oscillating connections;

Fig. 3, a vertical section taken on the line 3—3 of Fig. 1;

Fig. 4, a horizontal section taken on the line 4—4 of Fig. 2;

Fig. 5, a horizontal section taken on the line 5—5 of Fig. 2;

Fig. 6, a view of the saw sash and guide mechanism as they appear in Fig. 2, showing by broken lines the positions of the saw sash and guide mechanism at the middle and bottom of a reciprocative stroke;

Fig. 7, a view corresponding to that of Fig. 6, but taken with respect to the showing of Fig. 3;

Fig. 8, a line diagram representing the several pivot centers and connecting levers and links for the uppermost position of the saw sash and its associated oscillating guide mechanism;

Fig. 9, a fragmentary right side elevation of the upper portion of the machine broken out in Fig. 1, illustrating the oscillation drive arrangement taking power from one of the crankshafts of the mill;

Fig. 10, a line diagram tracing the reciprocative path of the saw sash of the sawmill as illustrated; and Fig. 11, a similar line diagram when the pair of restrictive links are of equal length.

Referring to the drawings:

Saw sash guide mechanism conforming to the invention is here illustrated as applied to the single sash gang sawmill of my aforementioned copending application Serial No. 453,290, in place of the more complicated guide mechanism there shown.

Thus, the sawmill proper comprises a single sash 10 having a plurality of individual saws 11 secured therein in mutually spaced, gang arrangement. The saw sash, together with feed rolls (only the lower feed rolls 12 and 13 are shown, the upper rolls being mounted in respective gates, see 14, Fig. 1), is mounted within a supporting framework having a base 15, upright end frames 16, and a top structure 17.

The saw sash is suspended within the framework for vertical reciprocation longitudinally of the saws 11 through a belt-drive connection (not shown) of pulley 18, Fig. 9, with any suitable prime mover. The power is transmitted through a pair of crankshafts, see 19, Fig. 9, to a pair of connecting rods designated 20, respectively, Figs. 1 and 2. The saw sash 10 is pivotally suspended from the ends of such connecting rods, as indicated.

The guide mechanism of this invention comprises, in its illustrated form, two pairs of suspension arms 26 of equal length, the individual suspension arms of each pair being spaced apart longitudinally of saw sash 10 and of the reciprocative path thereof, and the two pairs being mutually spaced apart transversely of such saw sash and its reciprocative path.

The suspension arms 26 have corresponding ends pivotally attached to the saw frame, as by means of respective pivot pin couplings 27 having horizontal axes. It is preferred that the pivotal attachments of each pair of suspension arms be aligned longitudinally of the saw sash and its reciprocative path, the pivot axes extending in parallel transversely thereof.

The opposite ends of the suspension arms are pivotally attached to respective ends of corresponding pairs of rocker links 28 of mutually equal lengths, whose other ends are pivotally secured to the end frames 16 of the supporting framework of the sawmill.

In the particular construction illustrated, the upper suspension arms 26 of the afore-mentioned two pairs of same are rigidly affixed, as by welding, to respective opposite ends of a shaft 29 having stub ends 29a journaled in the said respective ends of the upper rocker links 28 of the afore-mentioned pairs of same. The lower suspension arms are similarly affixed to respective opposite ends of a shaft 30 having stub ends 30a journaled in the said respective ends of the lower rocker links 28. The upper rocker links 28 have their opposite ends rigidly affixed to respective ends of a shaft 31 having stub ends 31a journaled in respective end frames 16. The lower rocker links 28 are similarly affixed to respective opposite ends of a shaft 32 having stub ends 32a journaled in respective end frames 16.

The above construction provides a guide mounting of floating parallelogram type for the saw sash 10. In order to complete such guide mounting, a pair of restrictive links 33, Figs. 2, 4, 5, and 6, are associated with one of the pairs of suspension arms 26, so as to additionally connect them with the corresponding end frame 16 of the supporting framework of the sawmill.

While, in instances where it is not desired to oscillate the saw sash transversely of its path of reciprocation, both of the restrictive links 33 may be pivotally secured directly to the supporting framework of the sawmill, in the preferred construction illustrated, wherein oscillating means are provided as an integrated part of the guide mechanism, one of the restrictive links 33 connects with the supporting framework of the sawmill through the intermediacy of lever means forming a part of the oscillation drive means to be described hereinafter.

Thus, as here illustrated, the restrictive links 33 have corresponding ends pivotally connected to respective suspension arms 26 of one pair of same, intermediate the lengths thereof, by means of respective pivot pins 34, see particularly Figs. 4 and 5. The opposite end of the lower of such restrictive links 33, see Figs. 2 and 5, is pivotally secured directly to end frame 16 by means of a pivot pin 35. The opposite ends of the upper of such restrictive links 33, see Figs. 2 and 4, is pivotally attached to the short arm 36a of a bell crank 36, which constitutes the lever means of the oscillation drive means. Such bell crank 36 is pivotally secured at the juncture of its two arms to the adjacent end frame 16 by a pivot pin 37, and its long arm 36b is pivotally coupled, as at 38, to the oscillation drive means.

For the purpose of constraining reciprocation of the saw sash 10 to a path found to be of maximum effectiveness for most sawing operations, as is more fully explained hereinafter, the upper of the pair of restrictive links 33 is made shorter than the lower, as indicated.

Referring now to Fig. 9, it can be seen that the oscillation drive means is advantageously powered by one of the pair of crankshafts 19. As shown, such drive means comprises an auxiliary crank or eccentric 40 on the crankshaft 19, connected in drive relationship to bell crank 36 by means of a connecting rod 41. The long arm 36b of such bell crank is coupled to the lower end of connecting rod 41, as by means of fitting 42 having upper and lower pivot axes at right angles to each other. Accordingly, rotation of crankshaft 19 actuates bell crank 36 in a regular oscillating movement.

It is preferred that oscillator crank or eccentric 40 be offset approximately 45 degrees from the main cranks on which connecting rods 20 are mounted.

In the operation of the sawmill, reciprocation of saw sash 10, as accomplished by means of the connecting rods 20, is constrained to follow a path predetermined by the oscillating guide mechanism of the invention. If the oscillation drive and connecting means were not present, the saw sash would be constrained to execute strictly rectilinear reciprocatory motion. With the oscillation drive and connecting means as illustrated, the reciprocatory path of the saw sash is as traced out in Fig. 10, which affords maximum cutting speed under conditions of saw sash oscillation.

If, however, the upper of the restrictive links 33 is equal in length with the lower, the reciprocating motion of the saw sash 10 will conform to a path corresponding to that traced out in Fig. 11, which is effective in practice, but which slows down the cutting speed of the sawmill. It is preferable that the saws 11 travel through a vertical, rectilinear path on the down stroke of the sash, and through an arc on the up stroke, as is the case in Fig. 10.

Whereas this invention is here illustrated and described with respect to a particular preferred construction, it should be realized that various changes may be made therein and that various other constructions may be utilized on the basis of the essential teachings hereof, without departing from the scope of the invention as defined by the claims which here follow.

I claim:

1. In a gang sawmill equipped with a saw sash mounted for up and down reciprocation within a vertical supporting framework and carrying a plurality of saw blades disposed in mutually spaced, side-by-side, gang formation, said sawmill being equipped, further, with means for reciprocating the saw sash, the provision of improved guide mechanism mounting the saw sash for reciprocation, said mechanism comprising a pair of suspension arms having mutually corresponding ends of the respective arms pivotally attached to the saw frame in mutually spaced relationship along the reciprocative path thereof; a pair of rocker links having mutually corresponding ends of the respective links pivotally secured to said supporting framework in mutually spaced relationship along said reciprocative path, and having their opposite ends pivotally attached, respectively, to the other ends of said suspension arms; and restrictive links having mutually corresponding ends thereof pivotally attached, respectively, to the suspension arms intermediate their lengths, said restrictive links extending in the same direction from their respective pivotal attachments to the suspension arms and having their opposite ends pivotally connected with said supporting framework.

2. In a gang sawmill equipped with a saw sash mounted for reciprocation within a supporting framework and carrying a plurality of saw blades disposed in mutually spaced, side-by-side, gang formation, said sawmill being equipped, further, with means for reciprocating the saw sash, the provision of improved guide mechanism mounting the saw sash for reciprocation, said mechanism comprising two mutually spaced apart pairs of suspension arms having mutually corresponding ends of the respective arms pivotally attached to the saw frame in mutually spaced relationship along the reciprocative path thereof; two pairs of rocker links having mutually corresponding ends of the respective links pivotally secured to said supporting framework in mutually spaced relationship along said reciprocative path, and having their opposite ends pivotally attached, respectively, to the other ends of said suspension arms; and a pair of restrictive links associated with one of said pairs of suspension arms, the said links having mutually corresponding ends thereof pivotally attached to the respective suspension arms of said one pair intermediate the lengths of the latter, said restrictive links extending in the same direction from their respective pivotal attachment to the suspension arms and having their opposite ends pivotally connected with said supporting framework.

3. In a gang sawmill equipped with a saw sash mounted for reciprocation within a supporting framework and carrying a plurality of saw blades disposed in mutually spaced, side-by-side, gang formation, said sawmill being equipped, further, with means for reciprocating the saw sash, the provision of improved saw sash mounting mechanism for simultaneously guiding and oscillating the saw sash during reciprocation, said mechanism comprising a pair of suspension arms having corresponding ends pivotally attached to the saw frame in mutually spaced relationship along the reciprocative path thereof; a pair of rocker links having respective ends pivotally secured to said supporting framework in mutually spaced relationship along said reciprocative path, and having the opposite ends pivotally attached, respectively, to the other ends of said suspension arms; a pair of restrictive links having corresponding ends pivotally attached, respectively, to the suspension arms intermediate their lengths, and having the opposite ends pivotally connected with said supporting framework; lever means pivotally connecting one of said pair of restrictive links with the supporting framework, the other restrictive link of said pair being pivotally secured directly to said framework; and oscillation drive means operatively connected with said lever means for oscillating the saw sash transversely of its said reciprocative path during its reciprocation.

4. The construction of claim 3, wherein the lever means is a bell crank.

5. The construction of claim 4, wherein the means for reciprocating the saw sash comprises a crankshaft, and wherein the oscillation drive means includes a connecting rod operably mounted on a crank of said crankshaft, and means linking said connecting rod to an arm of said bell crank.

6. In a gang sawmill equipped with a saw sash mounted for reciprocation within a supporting framework and carrying a plurality of saw blades disposed in mutually spaced side-by-side, gang formation, said sawmill being equipped, further, with means for reciprocating the saw sash, the provision of improved saw sash mounting mechanism for simultaneously guiding and oscillating the saw sash during reciprocation, said mechanism comprising two mutually spaced apart pairs of suspension arms having corresponding ends pivotally attached to the saw frame in mutually spaced relationship along the reciprocative path thereof; two pairs of rocker links having respective ends pivotally secured to said supporting framework in mutually spaced relationship along said reciprocative path, and having the opposite ends pivotally attached, respectively, to the other ends of said suspension arms; a pair of restrictive links associated with one of said pairs of suspension arms, the said links having corresponding ends pivotally attached to the respective suspension arms of said one pair intermediate their lengths, and having the opposite ends pivotally connected with said supporting framework; lever means pivotally connecting one of said pair of restrictive links with the supporting framework, the other restrictive link of said pair being pivotally secured directly to said framework; and oscillation drive means operatively connected with said lever means for oscillating the saw sash transversely of its said reciprocative path during its reciprocation.

7. The construction of claim 6, wherein the lever means is a bell crank.

8. The construction of claim 7, wherein the means for reciprocating the saw sash comprises a crankshaft; and wherein the oscillation drive means includes a connecting rod operably mounted on a crank of said crankshaft, and means linking said connecting rod to an arm of said bell crank.

9. The construction of claim 3, wherein the saw sash and its mounting mechanism are vertically disposed, so that one of the restrictive links of the pair of same is upper and the other is lower; and wherein the upper restrictive link is shorter than the lower.

10. The construction of claim 6, wherein the saw sash and its mounting mechanism are vertically disposed, so that one of the restrictive links of the pair of same is upper and the other is lower; and wherein the upper restrictive link is shorter than the lower.

References Cited in the file of this patent

UNITED STATES PATENTS

| 19,454 | Strong | Feb. 23, 1858 |
| 85,294 | Fellker | Dec. 29, 1868 |

FOREIGN PATENTS

| 6,428 | Norway | July 18, 1898 |
| 106,390 | Australia | Jan. 12, 1939 |